(12) United States Patent
Knapp

(10) Patent No.: US 12,392,125 B2
(45) Date of Patent: Aug. 19, 2025

(54) CONNECTOR FOR TWO COMPONENTS

(71) Applicant: Knapp Holding GMBH, Euratsfeld (AT)

(72) Inventor: Friedrich Knapp, Bad Kreuzen (AT)

(73) Assignee: Knapp Holding GMBH, Euratsfeld (AT)

( * ) Notice: Subject to any disclaimer, the term of this patent is extended or adjusted under 35 U.S.C. 154(b) by 286 days.

(21) Appl. No.: 18/218,332

(22) Filed: Jul. 5, 2023

(65) Prior Publication Data

US 2024/0011278 A1    Jan. 11, 2024

(30) Foreign Application Priority Data

Jul. 11, 2022   (EP) ..................................... 22184024

(51) Int. Cl.
   *E04B 1/26*        (2006.01)
(52) U.S. Cl.
   CPC .... *E04B 1/2604* (2013.01); *E04B 2001/2628* (2013.01); *E04B 2001/264* (2013.01); *E04B 2001/2652* (2013.01)
(58) Field of Classification Search
   CPC ............ E04B 1/2604; E04B 2001/264; E04B 2001/268; E04B 2001/2652; E04H 17/1417; E04H 17/1447; F16B 2/0052; F16B 7/22; Y10T 403/7069; Y10T 403/65
   See application file for complete search history.

(56) References Cited

U.S. PATENT DOCUMENTS

| | | | | |
|---|---|---|---|---|
| 3,819,198 A * | 6/1974 | Groves | ..................... | A63C 5/02 403/339 |
| 4,646,497 A * | 3/1987 | Hoenle | ................. | E04B 2/7407 52/286 |
| 5,406,797 A * | 4/1995 | Kawamura | ............. | F02B 37/10 290/52 |
| 5,913,781 A * | 6/1999 | Vidmar | ............... | E04H 17/1417 47/33 |
| 7,909,530 B2 * | 3/2011 | Okura | ................... | E04B 1/2604 403/230 |

(Continued)

FOREIGN PATENT DOCUMENTS

| EP | 2093334 A2 | 8/2009 |
|----|-----------|--------|
| EP | 3985189 A1 | 4/2022 |

OTHER PUBLICATIONS

Extended European Search Report issued in European Application No. 22184024.2 on Dec. 19, 2022.

*Primary Examiner* — Daniel J Wiley
(74) *Attorney, Agent, or Firm* — Hoffman & Baron, LLP

(57) ABSTRACT

A connector for two components comprises two fittings each with a mounting side, an abutment side opposite the mounting side, and an end face connecting the mounting and abutment sides. At the end faces the fittings may be hooked into one another. The fittings are made of wood or of wood-plastic composite and have one or more generally cylindrical blind holes on their abutment side. The connector comprises, for each blind hole, a molding for removable insertion into the blind hole. The molding has a base surface, a top surface parallel thereto, a substantially generally cylindrical lateral surface connecting these two, and a slanted bore for a mounting screw. The bore penetrates the molding at an acute angle to the base and top surfaces.

18 Claims, 3 Drawing Sheets

(56) References Cited

U.S. PATENT DOCUMENTS

| | | | |
|---|---|---|---|
| 8,322,942 B2* | 12/2012 | Howlett | F16B 5/0052 |
| | | | 403/374.4 |
| 11,661,742 B2* | 5/2023 | Bogdan | E04C 3/34 |
| | | | 52/378 |
| 2008/0213040 A1* | 9/2008 | Morze-Reichartz | E04C 3/18 |
| | | | 52/282.4 |
| 2019/0390455 A1 | 12/2019 | Knapp | |
| 2023/0375018 A1* | 11/2023 | Knapp | F16B 5/0036 |

* cited by examiner

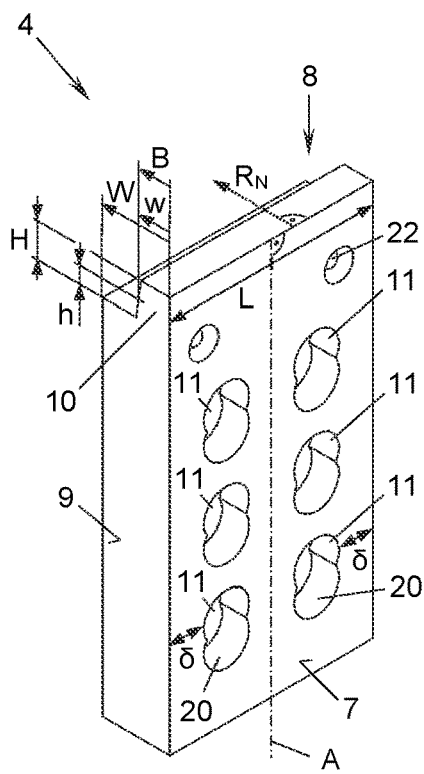
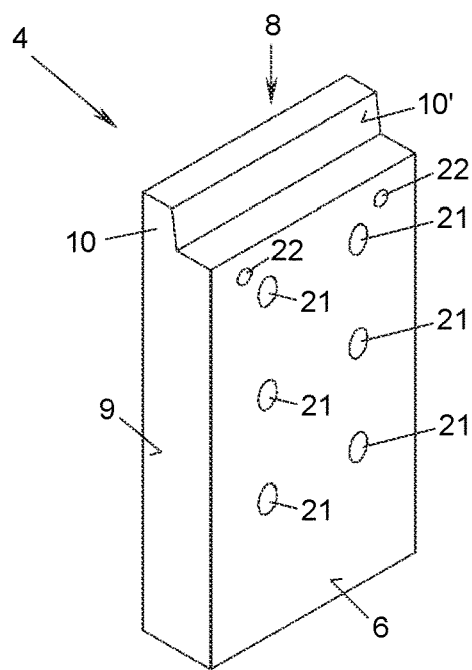
*Fig. 2a*  *Fig. 2b*
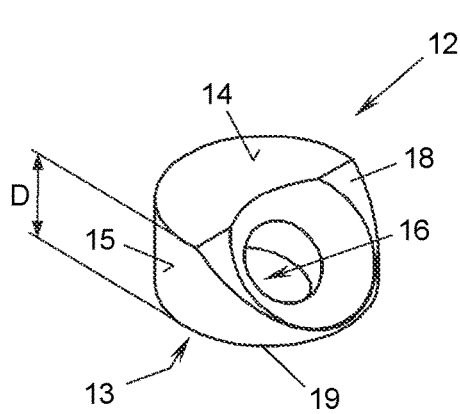
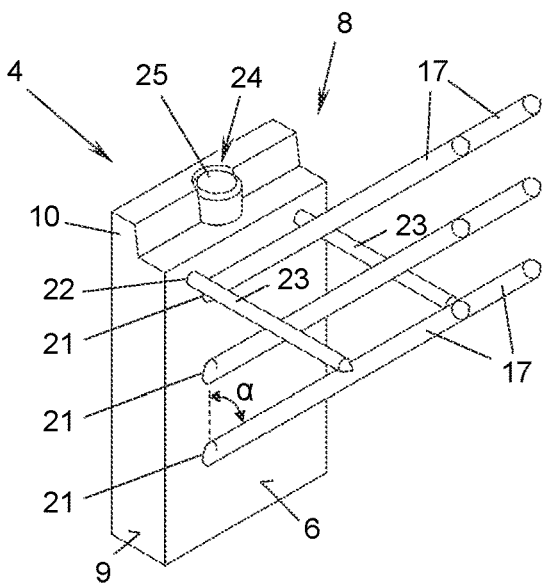
*Fig. 3*  *Fig. 4*

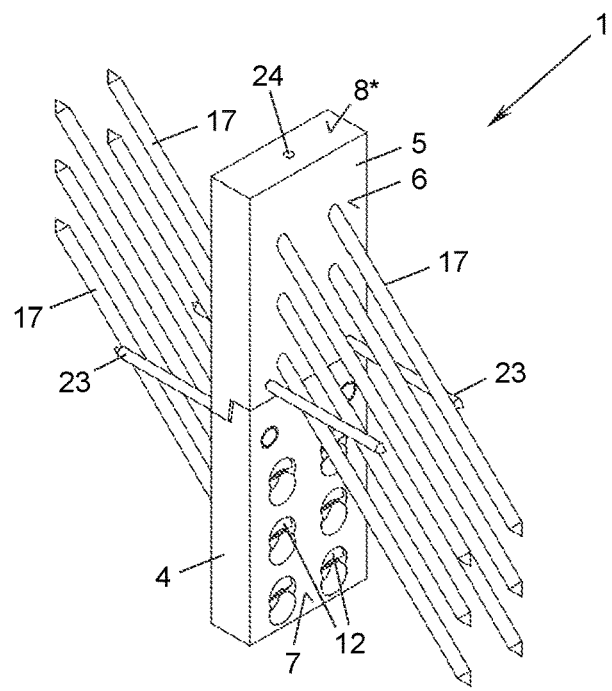
*Fig. 5*
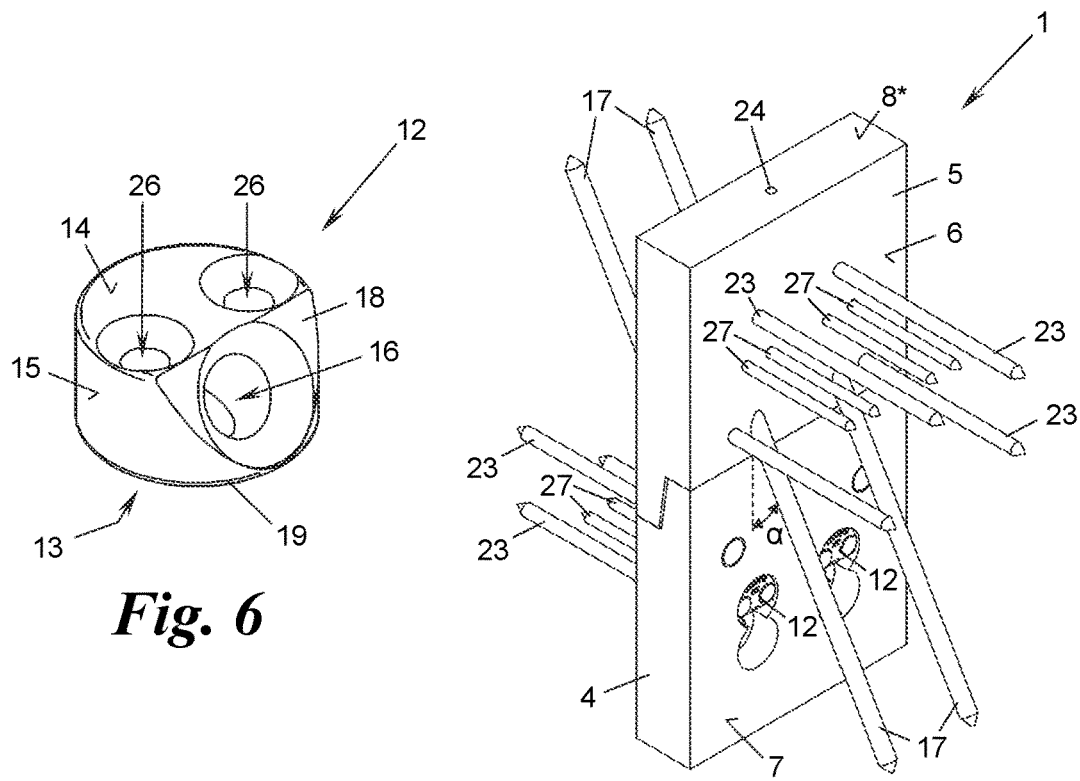
*Fig. 6*
*Fig. 7*

CONNECTOR FOR TWO COMPONENTS

CROSS-REFERENCE TO RELATED APPLICATIONS

This application claims priority to European Patent Application No. 22 184 024.2 filed Jul. 11, 2022 the disclosure of which is incorporated herein by reference.

TECHNICAL FIELD

The present invention relates to a connector for two components, in particular wooden components. The connector comprises two fittings, each of which has a mounting side for mounting on one of the components and an abutment side opposite the mounting side for contact against the other of the components, wherein the two fittings may be hooked into one another at an end face connecting the mounting and abutment sides, for which purpose the end face has, over its entire length running along the abutment side, a shoulder which is flush with the abutment side and the width of which in the direction orthogonal to the abutment side corresponds substantially to half the width of the end face.

BACKGROUND

Connectors of this type are particularly suitable for establishing heavy-duty connections in timber engineering, for example for connecting main, secondary or transverse beams, cross members, girders, columns, posts, walls or the like. The fittings are made of metal, for example high-strength aluminium or steel, and the components to be connected are made of wood, in particular glued laminated timber (glulam), laminated beams, etc. At least one of the components may alternatively be made of, for example, concrete, stone, masonry or even metal. For example, EP 3 985 189 A1 describes a connector with a comparable shoulder at its end face.

The fittings of such connectors are usually high-strength but hardly elastic, and therefore they tend to break under strong load impacts, for example during an earthquake or a sudden load peak, and frequent alternating loads, even of lesser magnitude, may lead to fatigue fractures. Due to the often multiple bolting of the fittings to their respective components, this does not lead to immediate failure of the connector in every case, but it does weaken the connection decisively, which often goes unnoticed until complete failure later on.

BRIEF SUMMARY

The invention aims to create a connector for a particularly durable connection of components even under high alternating and peak loads on the components.

This objective is achieved with a connector for two components, comprising
two fittings, each of which has a mounting side for mounting on one of the components and an abutment side opposite the mounting side for contact against the other of the components,
wherein the two fittings may be hooked into one another at an end face connecting the mounting and abutment sides, for which purpose the end face has, over its entire length running along the abutment side, a shoulder which is flush with the abutment side and the width of which shoulder in the orthogonal direction to the abutment side corresponds substantially to half the width of the end face,
wherein the fittings are made of wood, optionally of plywood, or of wood-plastic composite,
wherein each fitting has one or more generally cylindrical blind holes on its abutment side,
wherein the connector further comprises, for each blind hole, a molding for removable insertion into the blind hole,
the molding having a base surface, a top surface parallel thereto, a substantially generally cylindrical lateral surface connecting the base and top surfaces, and a slanted bore for a mounting screw,
wherein said slanted bore penetrates the molding at an acute angle to the base and top surfaces.

When hooking into each other, the aforementioned end faces of the fittings are placed one on top of the other, wherein the aforementioned shoulders engage behind each other, which leads to a secure connection of the components. In this context, wood or wood-plastic composite is also elastic despite its respective strength, wherein plywood achieves particularly high strength values, so that, on the one hand, fatigue phenomena and fractures are much less likely and, on the other hand, large load impacts are damped, which significantly reduces the risk of fracture and extends the service life of the connector and the connection. Wood-plastic composites ("WPC") are made of wood—mostly wood flour—and plastics as well as additives, including flame retardants, and may be processed similarly to plastics.

Even if metal fittings generally have a higher strength, it should be noted that, for fire protection reasons, metal fittings usually have to be encased in a fireproof manner. When joining wooden components, the encasement is usually achieved by countersinking the fittings and thus protecting them from heat and fire from the surrounding wood of the wooden components. On the one hand, the countersinking makes assembly more difficult; on the other hand, the encasement reduces the possible size of the fittings: the fittings must be smaller, by the thickness of the encasement, than the abutment faces of the components against each other. By contrast, the wooden or WPC fittings may use the entire abutment faces and are therefore larger than metal fittings for the same components, which benefits the strength.

The moldings could also be made of wood or WPC or of conventional plastic, for example a fibre-reinforced plastic. In one embodiment, each molding is made of metal, optionally steel. This embodiment takes advantage of the strength of metal, in particular steel. The strong moldings made of metal lead to a particularly good transmission of force between the mounting screws and the fitting. Since each molding is individually inserted into a blind hole of the (elastic) fitting in the assembly position, the risk of breakage is extremely low, even under very high loads or due to fatigue.

In order to achieve good fire resistance of the connector, it is advantageous if each of the blind holes of each fitting has a minimum distance of 2 cm, optionally between 4 and 6.5 cm, from the periphery of the abutment side of the fitting. By choosing the minimum distance, any fire protection requirements may be easily met.

The fittings may be used with moldings that differ in the size of the acute angle as required, for example to achieve adaptation to different grain directions of wooden components. On the other hand, in order to prepare for rapid assembly on site, it is convenient if, from each of the blind holes of each fitting, there is a bore inclined in the direction of the said end face of the fitting and penetrating the mounting side, which bore is arranged and oriented in such a way that, when a molding is inserted, its slanted bore may be brought into alignment with the bore. This also facilitates the correct screwing in of the mounting screws.

Depending on the material and load of the components, for example the woodgrain direction of wooden components, the aforementioned acute angle is optionally between 15° and 60°, further optionally between 25° and 50°. This leads to a reliable, firm connection of the components.

In order to evenly transfer forces from one component to the other, it is advantageous if each fitting has at least two blind holes, wherein the blind holes are arranged mirror-symmetrically to an axis of the abutment side that is orthogonal to and bisects the aforementioned end face. In a higher number, the mounting screws not only introduce the forces more evenly into the respective component, but in the case of a wooden component, they also strengthen the wood in the region of the fittings.

It is also advantageous if each fitting has a central end-face bore on said end face, orthogonal to the end face, into which hole a pin or screw may be inserted. The fittings are thus secured against slipping along the shoulder, i.e. parallel to both the end face and the abutment side. If the pin (or the screw) is inserted into the end-face bore of a fitting before the fittings are hooked into each other, it additionally has a centring effect when the fittings are hooked into each other. Alternatively, in an advantageous embodiment, the pin or the screw may be inserted only after the hooking operation, for which purpose at least one of the fittings is completely penetrated by said end-face bore.

It is particularly favourable if, as the height of the shoulder at the end face of each fitting increases, its width decreases and at half the height corresponds to half the width of the end face. The contact faces of the shoulders that come into contact with each other when the two fittings are hooked into each other are thus slanted, i.e. in such a way that the components are pulled together when they are hooked in. This simplifies the hooking and guarantees a secure fit of the components together.

To protect the fittings from sharp-edged loads, the slanted bore of each molding optionally penetrates its base surface without touching the edge between the base surface and the lateral surface. This edge thus runs around the base surface of the molding without any angular or sharp-edged interruptions and thus lies gently in the blind hole even under high tensile loads caused by the mounting screw for the fitting.

It is advantageous if the moldings are flush with the abutment side after insertion into the blind holes, for which purpose the blind holes have a depth that corresponds to the thickness of the moldings from their base to their top surfaces. On the one hand, this allows the abutment side to be in contact over its entire surface with the other component after assembly, which stabilises the connection. On the other hand, no installation space remains unused or the strength of the fittings is not reduced by excessively deep blind holes.

In an advantageous embodiment, each molding may be received in the blind hole with a form fit, and the blind hole has a recess for screwing in the mounting screw in a region facing away from said end face. The blind hole is thus adapted to the generally cylindrical shape of the molding and the molding lies with its base and—largely—its lateral surfaces against the blind hole, resulting in good introduction of force from the mounting screw via the molding into the blind hole and the fitting. Nevertheless, the mounting screw may be screwed in unhindered.

It is also advantageous if the base surface of each fitting is round. A complementary blind hole in the fitting is particularly easy to produce by milling or drilling. Furthermore, the force introduction of a round molding into the fitting is particularly uniform, since local force peaks, which would occur at the corners of an angled molding, for example, are avoided.

In an optional embodiment, each fitting is penetrated by at least one straight bore for a tension screw, said hole being orthogonal to the mounting side and adjacent to said end face. During the assembly of a fitting on the component, such straight tension screws are screwed in before the slanted mounting screws, which makes the slanted screwing without displacement of the fitting on the component much easier and ensures the correct fit. Furthermore, the tension screw, which is loaded purely by tension, counteracts a lifting of the fitting from the component in the event of a tensile load between the two components.

In order to further increase the strength of the connection, it is favourable if the connector also has at least two further bores for one further screw each, said bores flanking the slanted bore of each molding and penetrating the molding approximately orthogonally to the base and top surfaces. These further screws help to strengthen the components, in particular wooden components, in the region of the fittings.

BRIEF DESCRIPTION OF THE DRAWINGS

The invention is explained in greater detail below with reference to examples shown in the accompanying drawings, in which:

FIGS. 2a and 2b show a fitting of the connector according to the invention in a perspective view from the front (FIG. 2a) and from the rear (FIG. 2b);

FIG. 3 shows a molding of the connector according to the invention for the fittings of FIGS. 2a and 2b in a perspective view from above;

FIG. 4 shows a variant of the fitting of FIGS. 2a and 2b with inserted mounting screws in a perspective view from the rear;

FIG. 5 shows a variant of the connector according to the invention in the connected position without the components in a perspective view from the front;

FIG. 6 shows a variant of the molding of the connector according to the invention in a perspective view from above; and FIG. 7 shows a further variant of the connector according to the invention with inserted moldings in the connected position without the components according to FIG. 6 in a perspective view from the front.

DETAILED DESCRIPTION

Figure 1A:
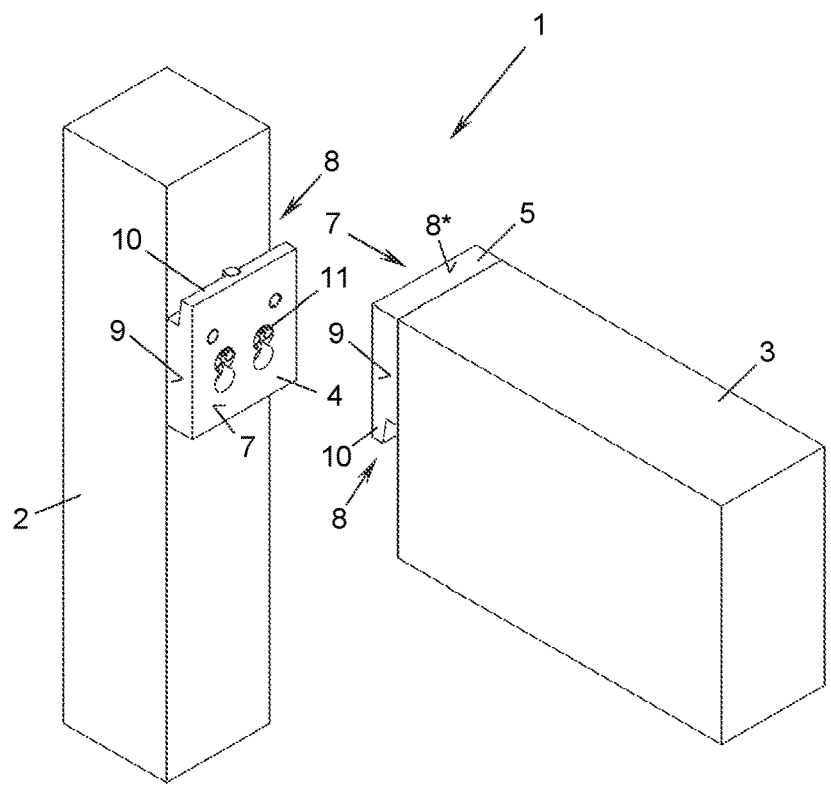
FIGS. 1a and 1b show a connector according to the invention with two components to be connected in a non-connected (FIG. 1a) and a connected position (FIG. 1B), in each case in a perspective view from the front.
Figure 1B:
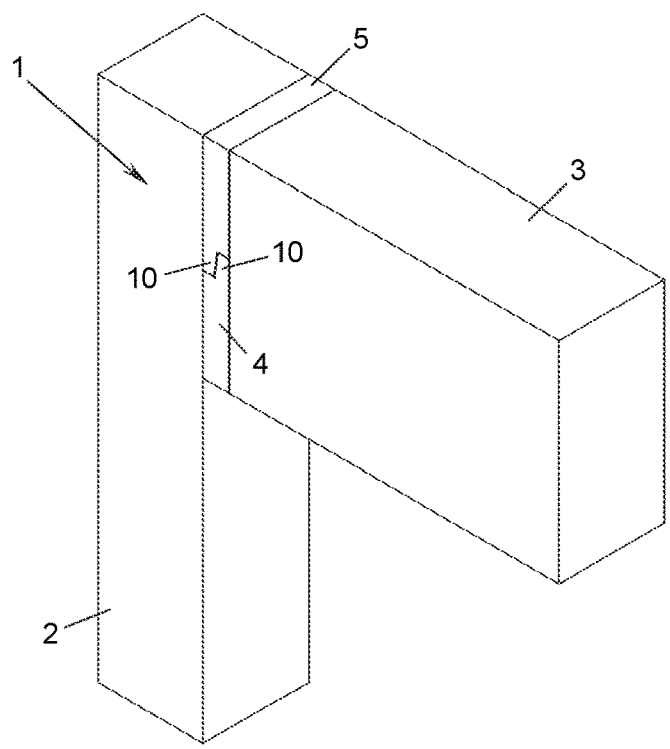

FIGS. 1a and 1b show a connector 1 for two components 2, 3. One component 2 is, for example, a column, a wall or the like, here: a column. The other component 3 is, for example, a main, secondary or transverse beam, a cross member, a girder or the like, here: a beam. The components to be connected are for example made of wood, in particular glued laminated timber (glulam), laminated beams, etc. At least one of the components is optionally made of another material, for example concrete, stone, masonry or even metal.

The connector 1 comprises two fittings 4, 5 made of wood, optionally plywood, or wood-plastic composite. Wood-plastic composites ("WPC"), which are also known as "wood (fibre) polymer composites", are made of wood—usually wood flour—and plastics as well as additives (here: in particular flame retardants) and may be processed similarly to plastics. It is understood that optionally, for example, one of the two fittings 4, 5 could also be made of wood and the other of WPC.

Each fitting 4, 5 has, for example, the shape of a—optionally rectangular—plate with a mounting side 6 (FIG. 2b; not visible in FIGS. 1a and 1b), an abutment side 7 opposite the mounting side 6, and an end face 8 connecting the mounting and abutment sides 6, 7; in the case of the rectangular shape, the fittings 4, 5 also have two lateral sides 9 and a further end face 8*, which is opposite the aforementioned end face 8 and which is not of further interest here, which each connect the mounting and abutment sides 6, 7. The fittings 4, 5 are mounted with their mounting sides 6 on one each of the components 2, 3, i.e. in the example of FIG. 1a the left fitting 4 with its mounting side 6 on the left component 2 and the right fitting 5 with its mounting side 6 on the right component 3.

The two fittings 4, 5 may be hooked into each other at the aforementioned end face 8, which in FIG. 1a is at the top on the left fitting 4 and at the bottom on the right fitting 5. In the hooked position (FIG. 1B), the abutment sides 7 of each fitting 4, 5 rest against the other of the components 3, 2, i.e. against the component 3, 2 on which the fitting 4, 5 is not mounted.

In FIGS. 2a and 2b only one of the components 4, 5 (here: component 4) is shown, since the two fittings 4, 5 in the present example are of identical construction. According to FIGS. 1a, 1b, 2a and 2b, the end face 8 of each of the fittings 4, 5 has a shoulder 10 of height H, which is flush with the abutment side 7, over the entire length L of the shoulder, running along the abutment side 7—which at the same time corresponds to the width of the abutment side 7; as a result, the abutment side 7 at the end face 8 projects beyond the mounting side 6 by the height H of the shoulder 10, as it were. The width B of the shoulder 10, i.e. its extent in the orthogonal direction RN to the abutment side 7, corresponds substantially to half the width w of the end face 8, i.e. half its extent W in the same direction. Said end face 8 thus has a higher half (by the height H) adjacent to the abutment side 7 and a lower half adjacent to the mounting side 6. As a result, when one fitting 4 (with its end face facing upwards) is mounted on one component 2 and the other fitting 5 (with its end face facing downwards) is mounted on the other component 3, an undercut is created behind each of the shoulders 10, in which undercuts the shoulders 10 engage with each other when they are hooked into each other and thus connect the components to each other.

The fact that the width B of the shoulder 10 corresponds "substantially" to half the width w of the end face 8 means here that as the height of the shoulder 10 increases, its width optionally decreases and corresponds here to half the width w of the end face 8 at half height h. In this case, the mutual contact face 10' of the shoulders 10 of the two fittings 4, 5 is thus slanted, so that the fittings 4, 5, when they are hooked into each other, are aligned with each other and the components 2, 3 are drawn together.

For mounting on the respective component 2, 3, each fitting 4, 5 has one or more generally cylindrical blind holes 11 on its abutment side 7. In the examples shown, the fittings 4, 5 have at least two blind holes 11. In this case, the blind holes are arranged in mirror symmetry with respect to an axis A of the abutment side 7, said axis being orthogonal to said end face 8 and bisecting it, i.e. starting at half of the length L of the end face 8. In the case of the rectangular fittings 4, 5 shown, said axis A is thus perpendicular to the end face 8 and runs centrally over the abutment side 7. If in this variant at least one of the fittings 4, 5 has an odd number of blind holes 11, at least one of the blind holes 11 is arranged on the axis A.

For fire safety reasons, each of the blind holes 11 of each fitting 4, 5 is optionally spaced from the periphery of its abutment side 7, if required; it has a minimum spacing 5 of at least 2 cm depending on the fire safety requirement, and between 4 and 6.5 cm for higher fire safety. The minimum distance 5 of a blind hole 11 is the distance which the blind hole 11 has from the nearest portion of the periphery of the abutment side 7.

FIG. 3 shows an example of a molding 12. The connector 1 comprises such a molding 12 for each blind hole 11, and said molding may be removably inserted into the blind hole 11. The moldings 12 are usually made of a material different from that of the fittings 4, 5, in particular are made of a—optionally fibre-reinforced—plastic or of metal, optionally of steel or aluminium. Even if moldings 12 could be made of wood in individual cases, they are always separate from the fittings 4, 5.

Each molding 12 has a base surface 13, a top surface 14 parallel thereto, and a lateral surface 15, which connects the base and top surfaces 13, 14 and is substantially generally cylindrical; the moldings are "substantially" generally cylindrical because each molding 12 has a slanted bore 16 for a mounting screw 17 (FIG. 4), said bore penetrating the molding 12 at an acute angle α to its base and top surfaces 13, 14, which is why the top and lateral surfaces 14, 15 have an optional chamfer 18 transverse to the slanted bore 16 for better abutment of a head of the mounting screw 17.

The acute angle α is between 15 and 60 degrees, depending on the requirements and material of the components 2, 3; in most cases it is between 25 and 50 degrees, in the case of the molding 12 of FIG. 3 it is about 45° (FIG. 4).

In order for the abutment sides 7 of the fittings 4, 5 to lie flat against the other component 2, 3 in the mutually hooked position, the blind holes 11 optionally have a depth which is equal to or greater than the thickness D of the moldings 12 from their respective base surfaces to their top surfaces 13, 14.

In the example of FIG. 3, the slanted bore 16 penetrates the base surface 13 of the molding 12 without touching or penetrating the edge 19 between the base surface 13 and the lateral surface 15. The edge 19 thus runs around the base surface 13 without interruption.

Furthermore, the molding 12 shown in FIG. 3 has a round base surface 13; other shapes, for example oval, kidney-shaped or polygonal, are alternatively possible. Optionally, the blind holes 11 are adapted not only to the thicknesses D but also to the shapes of the moldings 12, in particular the shapes of their base surfaces 13, so that each molding 12 is received with a form fit in the blind hole 11. In this case, the blind hole 11 may have a recess 20 on a region facing away from the end face 8 of its fitting 4, 5 for easier screwing in of the mounting screw 17. In the example of FIG. 2a, each blind hole 11 is produced by two overlapping blind bores, so that it has an approximately 8-shaped cross-section, in the part of which facing the end face 8 (here: upper part) the molding 12 with its round base surface 13 according to FIG. 3 may be inserted and in the other part of which (here: lower part) the recess 20 remains.

According to the example of FIGS. 2b and 4, the fittings 4, 5 (here: the fitting 4) have bores 21 which, starting from the blind hole 11, are inclined in the direction of the end face 8 and penetrate the mounting side 6. These inclined bores 21 are arranged and aligned in the blind holes 11 in such a way that, when each molding 12 is inserted, its slanted bore 16 may be brought into alignment with the inclined bore 21, i.e. the slanted bore 16 and the inclined bore 21 run at the same acute angle α, so that the mounting screw 17 may be turned in a straight line and unhindered through the molding 12 and the inclined bore 21 into the component 2, 3.

Optionally, each fitting 4, 5 also has at least one straight bore 22—in the example of FIGS. 2b and 4: two—orthogonal to the mounting side 6, for a tension screw 23 in each case, said bores being adjacent, i.e. close, to the end face 8 of the fitting 4, 5 and penetrating the fitting 4, 5. The tension screws 23 are used to fix the fitting 4, 5 to the respective component 2, 3, for example, before the mounting screws 17 are screwed in.

Alternatively or additionally, the fitting 4, 5 may be glued on its mounting side 6 to the respective component.

According to the example shown in FIG. 4, each fitting 4, 5 may have an end-face bore 24 on its end face 8, which bore is placed in the fitting 4, 5 in the centre of the end face 8 orthogonally thereto. The end-face bore 24 may in particular be a blind bore. A pin 25, for example, may be inserted into the optional end-face bore 24 so that the two fittings 4, 5 are centred when hooked into each other and are then locked by the pin 25 in the longitudinal direction of the end face 8.

An alternative is shown in FIG. 5, in which the pin 25 of the example in FIG. 4 is replaced by a screw (not visible in FIG. 5 because it is countersunk) that is screwed into the end-face bore 24. The end-face bore 24 completely penetrates the upper fitting 5 in FIG. 5 from top to bottom. Instead of the screw, a pin 25 could also be inserted into the end-face bore 24 in this example.

It should be noted that, for the aforementioned locking and also for protection against unwanted lifting of one fitting 4, 5 from the other and for further strengthening of the connection of the components 2, 3, the abutment sides 7 of the fittings 4, 5 may optionally be glued to the other component 3, 2.

FIGS. 6 and 7 show a further embodiment of the connector 1, in which each molding 12 is penetrated by at least two (here: exactly two) further bores 26, which are each for a further screw 27 and which flank the slanted bore 16 and penetrate the molding 12 approximately orthogonally to the base and top surfaces 13, 14. FIG. 7 shows the mutually hooked position of the two fittings 4, 5—for better visibility without the components 2, 3. The acute angle α in this case is about 30°.

The invention is not limited to the exemplary embodiments presented, but includes those variants, modifications and combinations thereof which fall within the scope of the appended claims.

What is claimed is:

1. A connector for two components, comprising
two fittings, each of which has a mounting side for mounting on one of the components and an abutment side opposite the mounting side for contact against the other of the components,
wherein the two fittings may be hooked into one another at an end face connecting the mounting and abutment sides, for which purpose the end face has, over its entire length running along the abutment side, a shoulder which is flush with the abutment side and the width of which shoulder in the orthogonal direction to the abutment side corresponds substantially to half the width of the end face,
wherein the fittings are made of wood or of wood-plastic composite,
wherein each fitting has one or more generally cylindrical blind holes on its abutment side,
wherein the connector comprises, for each blind hole, a molding for removable insertion into the blind hole,
said molding having a base surface, a top surface parallel thereto, a substantially generally cylindrical lateral surface connecting the base and top surfaces, and a slanted bore for a mounting screw,
wherein said slanted bore penetrates the molding at an acute angle to the base and top surfaces.

2. The connector according to claim 1, wherein each molding is made of metal.

3. The connector according to claim 1, wherein each of the blind holes of each fitting has a minimum distance of 2 cm from the periphery of the abutment side of the fitting.

4. The connector according to claim 1, wherein from each of the blind holes of each fitting there extends a bore which is inclined in the direction of said end face of the fitting and which penetrates the mounting side and which is arranged and oriented in such a way that, when a molding is inserted, its slanted bore may be brought into alignment with the bore.

5. The connector according to claim 1, wherein said acute angle is between 15° and 60°.

6. The connector according to claim 1, wherein each fitting has at least two blind holes, wherein the blind holes are arranged in mirror symmetry with respect to an axis of the abutment side, said axis being orthogonal to and bisecting said end face.

7. The connector according to claim 1, wherein each fitting has, at said end face, a central end-face bore which is orthogonal to the end face and into which a pin or a screw may be inserted.

8. The connector according to claim 7, wherein at least one of the fittings is completely penetrated by said end-face bore.

9. The connector according to claim 1, wherein as the height of the shoulder at the end face of each fitting increases, its width decreases and at half height corresponds to half the width of the end face.

10. The connector according to claim 1, wherein the slanted bore of each molding penetrates the base surface of the molding without touching an edge between the base and lateral surfaces.

11. The connector according to claim 1, wherein the blind holes have a depth corresponding to a thickness of the moldings from their base to their top surfaces.

12. The connector according to claim 1, wherein each molding may be received in the blind hole with a form fit and the blind hole has a recess for screwing in the mounting screw in a region facing away from said end face.

13. The connector according to claim 1, wherein the base surface of each molding is round.

14. The connector according to claim 1, wherein each fitting is penetrated by at least one straight bore for a tension screw, said straight bore being orthogonal to the mounting side and adjacent to said end face.

15. The connector according to claim 1, comprising at least two further bores for one further screw each, said further bores flanking the slanted bore of each molding and penetrating the molding approximately orthogonally to the base and top surfaces.

16. The connector according to claim 1, wherein the fittings are made of plywood.

17. The connector according to claim 1, wherein each of the blind holes of each fitting has a minimum distance between 4 and 6.5 cm from the periphery of the abutment side of the fitting.

18. The connector according to claim 1, wherein said acute angle is between 25° and 50°.

* * * * *